United States Patent [19]

Sauer et al.

[11] Patent Number: 4,468,840
[45] Date of Patent: Sep. 4, 1984

[54] CLAMP FOR HOSES OR THE LIKE

[75] Inventors: Heinz Sauer, Ronneburg; Willi Stichel, Maintal, both of Fed. Rep. of Germany

[73] Assignee: Rasmussen GmbH, Maintal, Fed. Rep. of Germany

[21] Appl. No.: 258,375

[22] Filed: Apr. 28, 1981

[30] Foreign Application Priority Data

May 5, 1980 [DE] Fed. Rep. of Germany ....... 3017178

[51] Int. Cl.³ ............................................. B65D 63/02
[52] U.S. Cl. ................................. 24/20 R; 24/16 PB; 24/20 TT
[58] Field of Search ............. 24/16 PB, 20 TT, 20 R, 24/255 SL; 100/212

[56] References Cited

U.S. PATENT DOCUMENTS

| 3,189,961 | 6/1965 | Heller | 24/20 TT |
| 3,402,436 | 9/1968 | Oetiker | 24/20 CW |
| 4,053,965 | 10/1977 | Marchou | 24/20 TT |
| 4,319,385 | 3/1982 | Marchou | 24/16 PB |

FOREIGN PATENT DOCUMENTS

| 869583 | 3/1953 | Fed. Rep. of Germany ... 24/20 CW |
| 826295 | 12/1959 | United Kingdom ............. 24/20 TT |

Primary Examiner—John J. Wilson
Attorney, Agent, or Firm—Kontler, Grimes & Battersby

[57] ABSTRACT

A clamp for hoses or the like has an elongated band the end portions of which overlap each other and are held in overlapped relationship to form a loop around the hose or the like. Each end portion has an outwardly extending projection which can be engaged by a tool to tension the clamp. The projection on the outer end portion is a lug which is plastically deformable in a direction toward the other end portion when the maximum permissible tensioning force is reached. This ensures that the maximum permissible force cannot be exceeded and allows for a visual control as to whether or not the clamp has been properly tightened.

19 Claims, 18 Drawing Figures

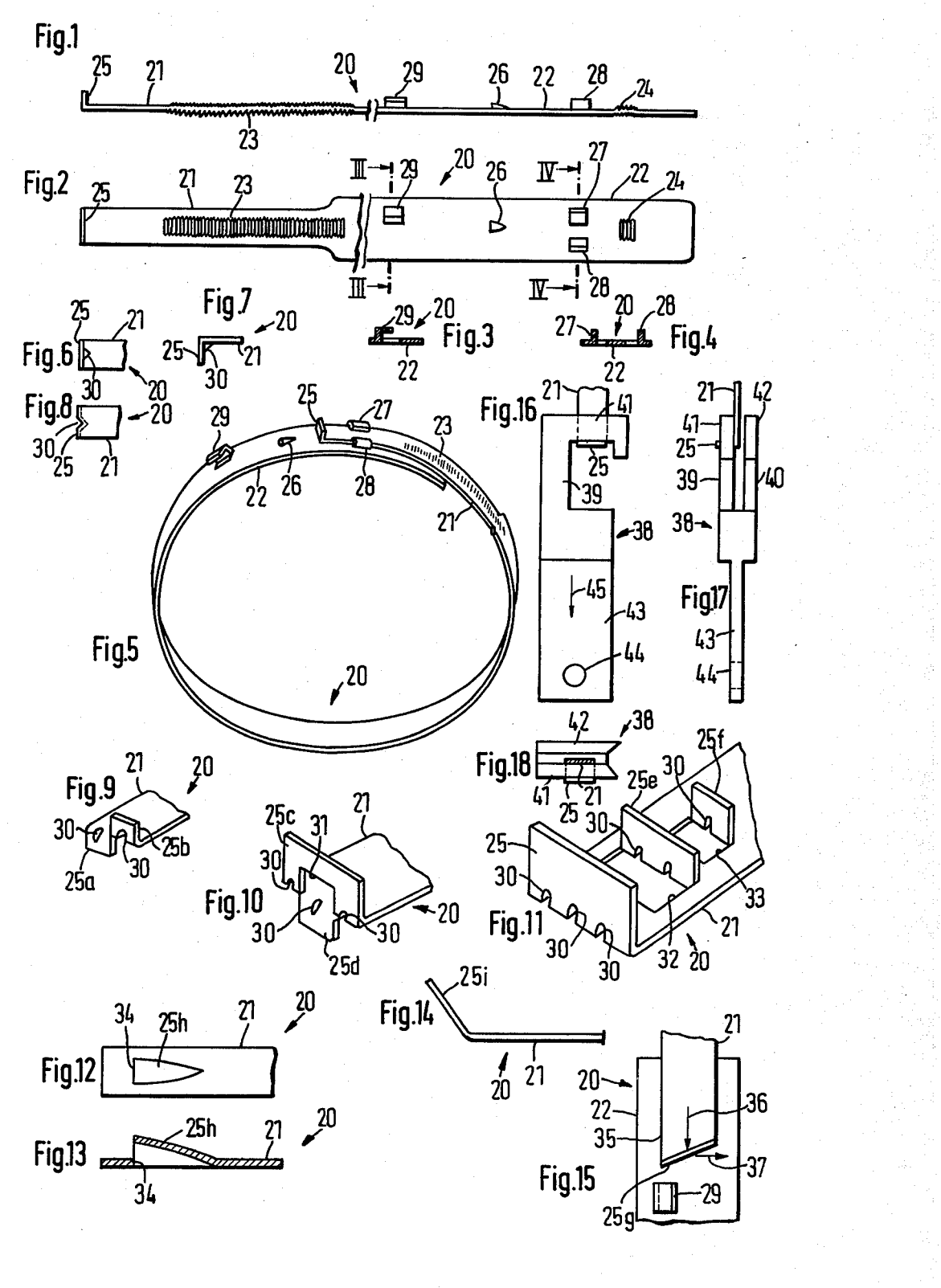

CLAMP FOR HOSES OR THE LIKE

BACKGROUND OF THE INVENTION

The present invention relates to a clamp for tubes, hoses or analogous commodities. More particularly, the invention relates to a clamp which does not require the customary worm drive for applying requisite tensional stresses and which is provided with means for indicating when a predetermined tension has been reached.

Clamps of the above outlined type are already known and are used, for example, to secure a hose on a nipple in an automotive vehicle or the like. A known clamp of this type has an elongated band the end portions of which overlap each other to form a loop surrounding the hose or a similar article. Each end portion is provided with a projection and such projections can be engaged by a tool which exerts a tensioning force in a direction to cause the end portions to overlap more, i.e., to reduce the size of the loop. One of these projections is a cup-shaped bead which is pressed from the material of the end portion; the wall thickness of the bead in the vicinity of the end portion is reduced along the entire circumference of the bead so as to define a weakened zone. When the maximum permissible tensioning force is reached, the projection breaks loose along the weakened zone and further tensioning (which could cause damage to the hose and/or to the nipple) is precluded. The visually detectable absence or presence of the projection indicates whether the clamp has been properly tensioned or not.

The aforedescribed conventional clamp exhibits certain disadvantages. Thus, the edge along which the projection has been broken off is usually quite sharp and may cause injury to workmen in the manufacturing plant or to others who have to deal with the clamp at a later time. If the clamp is employed in a mass producing plant, e.g., in an automobile manufacturing plant, piles of broken away projections will lie about so that they constitute a nuisance or even a hazard to the attendants. Last but not least, there is the danger that broken-away projections may drop into sensitive pieces of machinery, e.g., into an open engine block, where they can cause serious damage.

OBJECTS AND SUMMARY OF THE INVENTION

An object of the present invention is to provide a novel and improved clamp which establishes a limit to the maximum permissible tensioning force that can be applied to it and furnishes readily visible indications as to whether or not it has been properly tightened.

Another object of the invention is to provide a clamp which is not likely to cause injury to operators.

A further object of the invention is to provide a clamp which is not likely to cause damage to or contamination of machinery in which it is put to use.

One feature of the invention resides in the provison of a clamp for hoses and analogous commodities, e.g., tubes or the like. The improved clamp comprises an elongated band (e.g., a band consisting of metallic material) having two spaced apart end portions of which one may be wider than the other, and means for maintaining the end portions in overlapped positions so that the band forms a loop surrounding the hose, tube or a like commodity.

The clamp further comprises means for facilitating tensioning of the loop about a commodity, i.e., in a sense to reduce the size of the loop. Such means may include an outwardly extending tool-engaging projection on the outer end portion and such projection is plastically deformable in a direction toward the band in response to the application of a predetermined tensioning force to the band.

The improved clamp does not have any portions that are broken away to create the aforementioned problems inherent in conventional clamps. Instead, the projection simply undergoes plastic deformation when the maximum permissible tensioning force is reached, i.e., it folds over in a direction toward the band so that no further tensioning force can be applied. The folded-over condition of the projection indicates that the clamp has been properly tensioned, i.e., the bent-over projection provides an immediate and unmistakable visual indication of the fact that the loop has been tightened around a hose or the like.

The neighboring surfaces of the two end portions may be provided with two sets of cooperating transversely extending teeth whose flanks are shaped in such a way that, during tensioning, the sets slide freely over one another but the teeth engage and prevent release of the tensioned band when the application of tensioning force is terminated. Of course, the teeth could be provided on only one of these surfaces and a complementary projection or the like could be provided on the other surface.

The plastically deformable projection may be a lug formed from the material of the band by appropriate cutting or stamping; such operation, (i.e., cutting or stamping of the band itself and of the lug thereon) can be carried out in a single step, whereafter the lug is easily bent to a desired position for engagement by a tool.

A particularly simple manner of forming the lug is to cut or stamp it as the band itself is cut or stamped, and then to bend it relative to the band at the desired angle which may be 90° or more. The lug can be located at the extreme end of one of the band end portions and may project therefrom lengthwise of the band. However, it may also be formed by making incisions at or inwardly spaced from the free end of the end portion and then be bent out of the plane of such end portion. The aforementioned angle of 90° has been found to be advantageous because the effective lever arm of the lug can be varied in a simple manner merely by radially shifting the location where the tool engages the lug i.e., toward or away from the outer surface of the end portion, and to thereby select a different maximum tensioning force without it being necessary to make changes in the clamp or in the tensioning tool. It is also possible to reinforce the junction defined by the lug and the respective end portion of the band, i.e., the region where the lug merges into the end portion. Such reinforcing means may be in the form of at least one rib bridging the junction, i.e., the rib can be located partly in the lug and partly in the end portion. This increases the resistance of the lug to plastic deformation beyond that offered by a non-reinforced lug (and hence increases the maximum permissible tensioning force) without the need for other changes in the construction or material of the clamp.

Instead of using a single lug, it is also possible to use two or more lugs. Each of several lugs may offer identical resistance to plastic deformation, or each lug may offer a different resistance to plastic deformation. One or more of plural lugs can be used simultaneously (engaged by a tension-applying tool) to achieve the desired maximum permissible tensional force. Conversely, it is also possible to tension (or re-tension) the clamp two or more times, each time using a single lug (or a combination of lugs) not previously employed for the same purpose.

The inner end portion of the band may be provided with a retainer (e.g., a hook-extending radially and axially of the loop) which is adjacent one of its lateral edges and which can retain the deformed lug so as to hold it in place and prevent it from projecting from the loop. It is then desirable that a surface of the lug which is to be engaged by the tool lie askew with reference to the longitudinal direction of the band so as to make an acute angle with that edge of the band which is adjacent to the retainer. When the tensioning force is applied, the inclined surface causes the end portion carrying the lug to be shifted laterally and away from the retainer; on termination of the tensioning force, the end portion reassumes its original position and, in so doing, the lug moves below the retainer and is held thereby.

The novel features which are considered as characteristic of the invention are set forth in particular in the appended claims. The improved clamp itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view showing a clamp according to the invention in flat or extended condition prior to the formation of a loop;

FIG. 2 is a plan view of the clamp shown in FIG. 1;

FIG. 3 is a sectional view as seen in the direction of arrows from the line III—III of FIG. 2;

FIG. 4 is a sectional view as seen in the direction of arrows from the line IV—IV of FIG. 2;

FIG. 5 is a perspective view, showing the clamp of FIGS. 1-4 in looped condition, ready for use;

FIG. 6 is a fragmentary top plan view of one end portion of a second clamp;

FIG. 7 is a side elevational view of the structure shown in FIG. 6;

FIG. 8 is a bottom plan view of the structure shown in FIG. 6;

FIG. 9 is a fragmentary perspective view of a third clamp;

FIG. 10 is a view similar to that of FIG. 9 but showing a portion of a fourth clamp;

FIG. 11 is a view similar to that of FIG. 10, but showing a portion of a fifth clamp;

FIG. 12 is a fragmentary top plan view of one end portion of a sixth clamp;

FIG. 13 is a central longitudinal sectional view of the structure shown in FIG. 12;

FIG. 14 is a side elevational view of one end portion of a seventh clamp;

FIG. 15 is a fragmentary top plan view of the overlapping end portions forming part of an eight clamp;

FIG. 16 is a side elevational view of a tool for tensioning the improved clamp;

FIG. 17 is a plan view of the tool; and

FIG. 18 is an end elevational view of the tool.

DESCRIPTION OF THE PREFERRED EMBODIMENTS

A first embodiment of the invention is illustrated in FIGS. 1-5. The clamp comprises an elongated band 20 of metal (e.g., steel) having two spaced apart end portions 21 and 22. In this embodiment, the end portion 21 has a set of tranversely extending teeth 23 and the end portion 22 has a similar set of teeth 24 except that the set of teeth 24 is shorter than the set of teeth 23, as considered in the longitudinal direction of the band 20. The width of the end portion 21 is less than that of the end portion 22 (see FIG. 2) and of the remainder of the band 20.

The free end or tip of the end portion 21 has a lateral projection in the form of a lug 25 which is bent to extend radially outwardly of the band 20 at an angle of substantially 90° when the band is converted into a loop. The lug 25 constitutes the plastically deformable tool-engaging projection of the clamp. It has as its counterpart (for tool-engaging purposes) a lateral projection 26 which is bent out of the material of the end portion 22 and defines a tool-engaging surface.

The end portion 22 is further provided with two guide lugs 27 and 28 which are stamped or otherwise bent from the general plane of the band 20 at a transverse spacing which is slightly greater than the width of the end portion 21. As shown in FIG. 4, the lugs 27, 28 are first bent out at 90° angles; after the portion 21 is caused to overlap the portion 22, they are bent over the portion 21 (see FIG. 5) to hold it in place but loosely enough to permit shifting of the portions 21, 22 relative to one another in the circumferential direction of the loop formed by the band (FIG. 5) so as to permit tensioning of the clamp.

In addition, a retainer in the form of a hook 29 is stamped out from the material of the end portion 22 and is bent out so that it has a radially and an axially extending section, as viewed in FIG. 5. The radially extending section is located approximately on the line of one longitudinal edge of the end portion 22; its length, as considered in the radial direction, is slightly greater than the thickness of the band 20.

To tension the clamp (FIG. 5) about a hose or a similar article (not shown) inserted into its loop, the projections 25 and 26 are engaged by a tool and subjected to the action of a tensioning force acting in the circumferential direction of the loop. The tool may be a pair of pliers or the like and the resistance of the lug 25 in direction to plastic deformation is so selected as to withstand tensioning forces up to a predetermined maximum force. When this maximum force is reached, the lug 25 will bend over in direction toward the band 20 (i.e., it will yield to the force) so that the pliers or another tool will slip over it, thereby assuring that no force in excess of the predetermined maximum force can be applied. The deformation of the lug 25 (i.e., the fact that it has been bent out of its original position) provides a visual indication (e.g., during a final quality control test) that the clamp has been properly tightened.

The flanks of the teeth 23 and 24 are inclined in such a way that, during the application of tensioning force, the teeth 23, 24 slide past one another. When the application of tensioning force is terminated, i.e., when the tool is disengaged, the teeth engage one another and hold the end portions 21, 22 in the positions which they occupy at that time so that the applied tension remains. If the clamp is tensioned to such an extent that the free end of the portion 21 extends circumferentially beyond the projection 26, so that it necessarily also projects outwardly from the loop (which might be undesirable), the end portion 21 can be bent slightly sideways and radially inwardly so that, when released, it will spring back and enter the hook 29 to be retained by the same.

The clamp of FIGS. 1–5 can be used, without any changes, under circumstances requiring a maximum tensioning force different from the one discussed above. It is merely necessary to shift the location at which the tool engages the lug 25, i.e., either radially inwardly or outwardly of the loop so that the effective lever arm of the lug 25 increases or decreases, as the case may be. This changes the bending moment applied to the lug 25 by the tensioning force so that a smaller tensioning force is needed to plastically deform the lug toward the band 20 when the lever arm is increased, and vice versa.

The resistance of the lug 25 to bending can be increased without having to change the thickness or width or material of the band 20 or of the end portion 21 thereof. This is illustrated in FIGS. 6–8 which show that the resistance to bending can be increased by providing the lug 25 with reinforcing means. Specifically, the locus where the lug 25 merges into the end portion 21 is formed with a centrally located rib 30 which is partly formed in the end portion 21 and partly in the lug 25. Naturally, more than one such rib could be provided, and each additional rib would enhance, to a predetermined extent, the resistance which the lug 25 offers to bending stresses.

FIG. 9 shows that the end portion 21 (throughout the description, similar reference characters are used to denote identical or analogous parts) can have more than one lug. In this embodiment, an endwise incision into the free end of the portion 21 and bending of the thus obtained sections in opposite directions provides two lugs 25a and 25b each of which may or may not be provided with a reinforcing rib 30. Since the cross section of each of the lugs 25a, 25b is smaller than that of the lug 25, the resistance of each of the lugs 25a, 25b to bending will also be smaller; consequently, the maximum tensional force that can be applied before each individual lug 25a, 25b bends is also smaller. A smaller maximum tensional force can be selected by having the tool engage only one of the lugs 25a, 25b. If the tool is such that it can simultaneously engage the lugs 25a, 25b, the maximum tensional force will equal that which can be applied to the lug 25 of FIGS. 6–8, assuming that the lug 25 were provided with two ribs 30, or somewhat higher than that adapted to be applied to the lug 25 if the latter has only one rib 30. Of course, it is also possible to use only one of the lugs 25a, 25b and, if the same clamp is to be re-used at a subsequent time, to then use the other lug, a feature which is not exhibited by the previously described embodiments.

FIG. 10 illustrates an embodiment which is somewhat similar to that of FIG. 9 in that it also comprises two lugs, here denoted by the reference characters 25c and 25d. The end portion 21 is provided with a U-shaped incision and the two lugs are bent out of the plane of the end portion 21 in opposite directions, so as to be located in a common vertical plane (of course, this changes after tensioning). Each of the lugs 25c and 25d may be provided with one or more ribs 30 (one shown) for reinforcing purposes. These lugs exhibit different resistances to bending. They may be used individually or simultaneously for tensioning of the clamp, depending upon the maximum tensioning force which is desired or required. Thus, the embodiment of FIG. 10 renders it possible to select any one of three different tensioning forces.

FIG. 11 shows an embodiment having a first lug 25 which corresponds to the one shown in FIGS. 1–5 except that it is provided with three reinforcing ribs 30 of the type shown in FIGS. 6–8. In addition, the band 20 of FIG. 11 has two further lugs 25e and 25f of which the former has two ribs 30 and the latter has one rib 30. The lugs 25e and 25f are formed by providing the end portion 21 with U-shaped incisions 32, 33 which are spaced apart from one another lengthwise of the end portion 21. Since the cross sections of the three lugs 25, 25e and 25f differ from each other, as do the reinforcements provided for them, this embodiment again offers a choice of three different tensioning forces which can be chosen as needed. Moreover, if the tensioning tool is appropriately configured to permit for engagement of a single lug, of two lugs together or of three lugs together, the number of different available tensioning forces can be as high as six.

In FIGS. 12 and 13, the lug 25h is formed by providing the end portion 21 with an incision 34 which is normal to the longitudinal direction of the band 20 and by bending out the material at an angle so that the lug slopes outwardly toward the free (left-hand) end of the end portion 21. The lug 25h has a part-conical shape (see FIG. 13) which guarantees a relatively high resistance to bending and a correspondingly high maximum tensioning force.

In FIG. 14, the lug 25i and the end portion 21 make an obtuse angle which may be about 135°. In all other respects, this embodiment is the same as the one shown in FIGS. 1–5. The difference is sufficient to provide a different maximum tensioning force. Since the lug 25i is inclined prior to tensioning, the tensioning force exerted by the tool will have a radial component right from the start which means that the force required to effect bending of the lug 25i toward the band 20 is smaller than the force which must be applied to bend the lug 25 of FIGS. 1–5.

FIG. 15 shows a construction in which the lug 25g is inclined an angle of 90°, as is the lug 25 of FIGS. 1–5. In addition to such inclination, the lug 25g is inclined askew to the longitudinal direction of the portion 21, i.e., it makes an acute angle with the edge face 35 facing toward the retaining hook 29. Thus, when a tensioning force is applied in the direction of arrow 36, a component thereof tends to displace the end portion 21 laterally, in the direction of arrow 37, moving it away from the hook 29 so that it can bypass the hook. When the force applied by the tool is terminated, the portion 21 springs back to its illustrated position (i.e., counter to the direction indicated by arrow 37) and, since it has advanced with its front end past the hook 29, it will move below the hook 29 to be retained thereby.

Different types of tools may be used for tensioning of the improved clamp. For example, one can resort to a pair of pliers. A tool which is particularly suitable for the purpose is illustrated, by way of example, and for the sake of completeness, in FIGS. 16–18. Reference numeral 38 denotes a forked tool portion the free end of which has arms 39, 40 provided with hooks 41, 42. The tool portion 38 has a shank 43 with a hole 44 by means of which it is mounted in the remainder (not illustrated) of the tool.

To tension a novel clamp with the tool of FIGS. 16–18, the hook 41 is moved behind the lug 25 (see FIGS. 16–18) and is then pulled in the direction of the arrow 45. During such movement, the other (not illustrated) part of the tool is supported against the radial surface of the projection 26. Depending upon the width of the gap between the arms 39 and 40 in relation to the thickness of the band 20 or the end portion 21 thereof, the effective lever arm of the lug 25 can be shorter or longer. For example, if the hook 42 is in contact with the end portion 21, the effective lever arm of the lug 25 is greater than in the illustrated position in which the end portion is engaged by the hook 41. The tool thus permits for selection of different tensioning forces without requiring any modifications of the clamp or the tool.

The improved clamp is susceptible of numerous additional modifications. For example, the clamp shown in FIGS. 12–13 can have more than one lug 25h, and the lugs can be laterally adjacent to one another or they may be arrayed lengthwise of the end portion 21. Different types of lugs need not be used only in separate embodiments, i.e., two or more different types of lugs could be used in one and the same clamp. Although metal is the presently preferred material for the band 20, the band could be made of synthetic plastic material, for example, glass-fiber reinforced polyamide. The band 20 may have a constant width throughout if the guide lugs 27, 28 are replaced by a guide element which performs their function. The hook 29 could be modified or replaced by two lugs corresponding to the lugs 27, 28 which would have to be bent over the end portion 21 in one and the same direction (i.e., not in opposite directions).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A clamp for hoses and analogous commodities, comprising an elongated band having two spaced apart end portions; means for maintaining said end portions in overlapped relationship so that the band forms a loop around a commodity; and means for facilitating tensioning of said band about a commodity within the loop, including an outwardly extending projection provided on one of said end portions and being plastically deformable in response to the application of a predetermined tensioning force acting lengthwise of the band; wherein said projection and said one end portion define a junction, and further comprising reinforcing means at said junction.

2. A clamp as defined in claim 1, wherein said band consists of a metallic material.

3. A clamp as defined in claim 1, wherein said end portions have neighboring surfaces and at least one of said surfaces has teeth engaging the other of said surfaces.

4. A clamp as defined in claim 3, wherein said teeth extend substantially radially of said loop.

5. A clamp as defined in claim 3, wherein each of said surfaces has a set of teeth and the teeth of said sets mate with one another when the application of said tensioning force is terminated so as to maintain said band in tensioned condition.

6. A clamp as defined in claim 1, wherein said projection is a lug formed from the material of said one end portion.

7. A clamp as defined in claim 1, wherein said projection is a lug extending outwardly at an angle from said one end portion.

8. A clamp as defined in claim 1, wherein the angle between said lug and said one portion is at least 90°.

9. A clamp as defined in claim 1, wherein said reinforcing means comprises at least one rib.

10. A clamp as defined in claim 1, further comprising at least one additional projection on said one end portion.

11. A clamp as defined in claim 10, wherein said projections offer substantially identical resistance to plastic deformation in response to the application of tensioning forces.

12. A clamp as defined in claim 1, further comprising retainer means provided on the other of said end portions for retaining said projection in the proximity of said other end portion subsequent to plastic deformation resulting from the application of the tensioning force.

13. A clamp as defined in claim 12, wherein said retainer means is hook-shaped and includes sections extending radially and axially of the loop.

14. A clamp as defined in claim 12, wherein said band having two lateral edges, and said retainer means is adjacent one of said lateral edges.

15. A clamp as defined in claim 14, wherein said projection has a surface which is inclined with reference to the longitudinal direction of said band and makes an acute angle with said one lateral edge.

16. A clamp as defined in claim 1, wherein said band consists of synthetic plastic material.

17. A clamp as defined in claim 16, wherein said synthetic plastic material is glass-fiber reinforced polyamide.

18. A clamp for hoses and analogous commodities, comprising an elongated band having two spaced apart end portions; means for maintaining said end portions in overlapped relationship so that the band forms a loop around a commodity; and means for facilitating tensioning of said band about a commodity within the loop, including an outwardly extending projection provided on one of said end portions and being plastically deformable in response to the application of a predetermined tensioning force acting lengthwise of the band, further comprising additional projections provided on said one end portion, said projections offering differing degrees of resistance to plastic deformation in response to the application of tensioning forces thereto.

19. A clamp as defined in claim 18, wherein at least one of said projections is provided with reinforcing means.

* * * * *